(12) United States Patent
Tan et al.

(10) Patent No.: US 10,046,946 B2
(45) Date of Patent: Aug. 14, 2018

(54) MEASURING WEIGHT OF A COMPARTMENT

(71) Applicants: OTIS ELEVATOR COMPANY, Farmington, CT (US); Gang Tan, Tianjin (CN); Zhiyong Yao, Tianjin (CN); Xiaofei Guo, Pudong, Shanghai (CN); Bin Wu, Pudong, Shanghai (CN)

(72) Inventors: Gang Tan, Tianjin (CN); Zhiyong Yao, Tianjin (CN); Xiaofei Guo, Shanghai (CN); Bin Wu, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 282 days.

(21) Appl. No.: 14/772,529

(22) PCT Filed: Mar. 5, 2013

(86) PCT No.: PCT/CN2013/072194
§ 371 (c)(1),
(2) Date: Sep. 3, 2015

(87) PCT Pub. No.: WO2014/134788
PCT Pub. Date: Sep. 12, 2014

(65) Prior Publication Data
US 2016/0002004 A1 Jan. 7, 2016

(51) Int. Cl.
*B66B 11/02* (2006.01)
*G01G 23/06* (2006.01)
(Continued)

(52) U.S. Cl.
CPC .......... *B66B 1/3476* (2013.01); *B66B 5/0031* (2013.01); *B66B 11/0226* (2013.01);
(Continued)

(58) Field of Classification Search
CPC . B66B 1/3476; B66B 5/0031; B66B 11/0266; B66B 11/0273; G01G 3/04;
(Continued)

(56) References Cited

U.S. PATENT DOCUMENTS

| 6,505,718 | B2 * | 1/2003 | Fujita | F16F 3/026 |
| | | | | 188/267 |
| 8,047,335 | B2 | 11/2011 | Fargo et al. | |
| 2013/0269450 | A1 * | 10/2013 | Schlicker | G01L 1/12 |
| | | | | 73/862.625 |

FOREIGN PATENT DOCUMENTS

| CN | 2707717 Y | * | 7/2005 | ............... B66B 5/28 |
| CN | 2889992 Y | * | 4/2007 | ............... B66B 5/00 |

(Continued)

OTHER PUBLICATIONS

Shuhai Wu Quan, "Load Detector for Elevator Cabin", English Translation of CN 2889992 Y, Apr. 2007.*
Tianmin Li, "Elevator Buffer Attachment", English Translation of CN 2707717 Y, Jul. 2005.*
(Continued)

*Primary Examiner* — Stephen W Smoot
(74) *Attorney, Agent, or Firm* — Cantor Colburn LLP (57) ABSTRACT

Disclosed a load measurement system (100) includes a compartment (110), a damper (112) and a weight calculation unit (131). The damper (112) is configured to be positioned between the compartment (110) and a platform (121) and to compress at a predetermined rate based on a load of the compartment (110). The weight calculation unit (131) is configured to calculate a weight of the compartment (110) based on the compression of the damper (112).

12 Claims, 6 Drawing Sheets

(51) Int. Cl.
*B66B 1/34* (2006.01)
*B66B 5/00* (2006.01)
*G01G 9/00* (2006.01)
*G01G 19/00* (2006.01)
*G01G 3/04* (2006.01)
*G01G 19/18* (2006.01)

(52) U.S. Cl.
CPC ............ *B66B 11/0266* (2013.01); *G01G 3/04* (2013.01); *G01G 9/00* (2013.01); *G01G 19/00* (2013.01); *G01G 23/06* (2013.01); *G01G 19/18* (2013.01)

(58) Field of Classification Search
CPC .......... G01G 3/06; G01G 9/00; G01G 19/005; G01G 19/18; G01G 23/06
See application file for complete search history.

(56) References Cited

FOREIGN PATENT DOCUMENTS

| CN | 201660344 U | 12/2010 | |
|---|---|---|---|
| JP | 05-278965 A | * 10/1993 | ............... B66B 5/14 |
| JP | H05278965 A | 10/1993 | |
| JP | H06234476 A | 8/1994 | |
| JP | H11255447 A | 9/1999 | |
| JP | 2009222542 A | 1/2009 | |

OTHER PUBLICATIONS

Kunio Takeuchi et al., "Elevator Cage Load Detector", English Translation of JP 05-278965 A, Oct. 1993.*
International Search Report and Written Opinion for application PCT/CN2013/072194 dated Dec. 12, 2013, 14 pages.

* cited by examiner

MEASURING WEIGHT OF A COMPARTMENT

BACKGROUND OF THE INVENTION

Embodiments of the invention relate to measuring the weight of a compartment, and in particular to the measurement of a compression of a damper with a non-contact sensor.

Moveable compartments, such as elevator cars, may be rated to handle a predetermined load, and may have systems to measure the load in the elevator to make sure that the load is within the rating of the elevator. In one conventional system, the weight of the elevator car is measured by measuring a tension of belts, cables or ropes that support or drive the elevator car. However, this system may have relatively high costs associated with the components for controlling and measuring the weight of the elevator car. In another conventional system, pressure sensors are positioned between a bottom of the elevator car and a platform on which the elevator car rests. The weight of the elevator car is measured by measuring the pressure of the pressure sensors. However, this system may be complicated and requires adjustment and calibration to obtain accurate weight measurements.

BRIEF DESCRIPTION OF THE INVENTION

Embodiments of the present invention include a load measurement system including a compartment, a damper configured to be positioned between the compartment and a platform and to compress at a predetermined rate based on a load of the compartment and a weight calculation unit configured to calculate a weight of the compartment based on the compression of the damper.

Embodiments of the invention further include a damper including an upper plate configured to be attached to a compartment, a lower plate configured to contact a platform and an elastic filler surrounding the first spring. The first spring and the elastic filler are configured to compress at a predetermined rate based on a force being exerted against the upper plate and the lower plate.

Embodiments of the invention further include a method including compressing a damper between a compartment and a platform and sensing a compression distance of the damper, corresponding to a difference between a non-compressed state and a compressed state based on the compressing of the damper. The method also includes calculating a weight of the compartment based on the compression distance of the damper.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Conventional elevator load calculation systems require substantial cost, adjustment and calibration to obtain accurate weight measurements of elevator cars. Embodiments of the invention relate to the measurement of compartment loads using non-contact sensors to detect a compression of dampers having predetermined compression characteristics.

Figure 1:
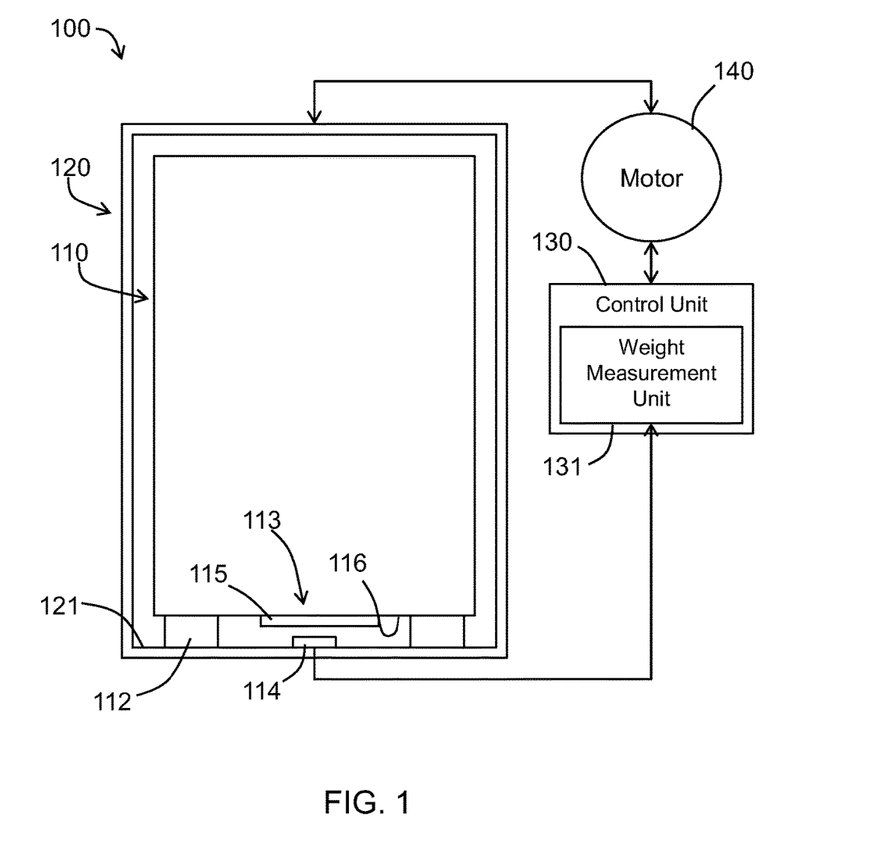
FIG. 1 illustrates a system for measuring the weight of a compartment according to one embodiment of the invention.

FIG. 1 illustrates a system 100 for measuring the weight of a compartment 110 according to an embodiment of the invention. In one embodiment, the compartment 110 is an elevator in an elevator shaft, driven by ropes, cables or straps and one or more motors 140. The system 100 includes dampers 112 located between a bottom surface 116 of the compartment 110 and a platform 121. As illustrated in FIG. 1, the platform 121 may be the bottom surface of a carriage 120, such as an elevator carriage that houses the compartment 110. The dampers 112 are configured to compress based on a force being applied to the upper and lower surfaces of the dampers 112. The dampers 112 may be connected to an underside 116 of the compartment 110 and to the platform 121. In one embodiment, the dampers 112 are permanently affixed to the underside of the compartment 110 and to the platform 121, such as by bolts, welds or any other permanent attachment method. In such an embodiment, the platform 121 is moved with the compartment 110 along a shaft, such as an elevator shaft. The platform 121 may be connected directly to cables, ropes, belts, rods or other mechanisms for driving the compartment in the shaft, and the weight of the compartment 110 may rest on the platform 121. In such an embodiment, the platform 121 may be a flat plate or may have portions that extend vertically along sides of the compartment 110 to engage cables, ropes, belts, rods or other driving mechanisms. In another embodiment, weight-supporting structures may be inserted into a passage, such as an elevator shaft, underneath the platform 121 to support the weight of the compartment 110.

In the embodiment illustrated in FIG. 1, the platform 121 is part of a carriage 120 that is supported by cables, ropes, belts, rods or other driving mechanisms connected to, and driven by, the motor 140. The cables may drive the carriage 120, and thus the compartment 110, vertically, such as along an elevator shaft. A sensor assembly 113 may measure a compression of the dampers 112 by measuring a distance between the platform 121 and the underside 116 of the compartment 110 to measure a weight of the compartment 110, including any load in the compartment 110.

In another embodiment, the compartment 110 may be driven independently of a carriage 120, and the platform 121 may be a stationary platform that is not connected to a carriage 120. In such an embodiment, the dampers 112 are fixed to only one of the compartment 110 and the platform 121 and the compartment 110 moves along a shaft, such as an elevator shaft, until the compartment 110 engages the platform 121, such that the dampers 112 are compressed between the underside 116 of the compartment 110 and the platform 121. For example, in one embodiment, the dampers 112 are connected only to the underside of the compartment 110 and the platform 121 is a stationary platform 121, such as on a ground floor of an elevator shaft. When the compartment 110 reaches the ground floor, the dampers 112 fixed to the underside 116 of the compartment 110 compress between the underside 116 of the compartment 110 and the platform 121.

In one embodiment, the dampers 112 include springs and a rubber filling to compress at a predetermined rate or according to a predetermined algorithm. In one embodiment, the predetermined algorithm is a linear algorithm, such that the compression distance of the dampers 112 is multiplied by a constant to obtain a weight of the compartment. In embodiments of the invention, the dampers 112 may be configured to have a linear relationship between a weight applied to the dampers 112 and a compression distance according to a design of a spring and an elastic material in the dampers 112. For example, an elastic material may have a density that changes from a top of the dampers 112 towards a bottom of the damper, and a spring may have coils that have distances between adjacent coils that change from a top of the dampers 112 to the bottom of the dampers 112.

The system 100 further includes a sensor assembly 113 configured to measure a compression distance of the dampers 112. In one embodiment, the sensor assembly 113 includes a sensor 114 located on the platform 121 and a sensor plate 115 located on the underside 116 of the compartment 110 opposite the sensor 114. The sensor 114 detects a distance between the sensor 114 and the sensor plate 115 and outputs a corresponding signal to a weight measurement unit 131 of a control unit 130. The weight measurement unit 131 calculates a weight of the compartment 110, including any load inside the compartment 110, based on the output of the sensor 114.

In one embodiment, the weight measurement unit 131 calculates a difference between a pre-stored height of the dampers 112 when not compressed, and a compressed height of the dampers 112. The calculated difference is applied to a stored algorithm to calculate the weight of the compartment, including any load applied to the compartment, such as by people or objects occupying the compartment. In one embodiment, the stored algorithm is a linear algorithm that multiplies the calculated difference by a constant to obtain the weight of the compartment. In other words, in one embodiment, the dampers 112 are designed such that the spring components and the elastic components of the damper together compress at a linear rate with respect to a load applied to the dampers 112.

In one embodiment of the invention, the weight measurement unit 131 is located in a car operation panel of the compartment 110. In other words, the weight measurement unit 131 is connected to the compartment 110 or the carriage 120 and moves together with the compartment 110 and carriage 120 along a passageway, such as an elevator shaft. However, it is understood that embodiments of the invention encompass a weight measurement unit 131 located remotely from the compartment 110 and carriage 120, such as in an elevator machine room. In such an embodiment, measurements from the sensor assembly 113 may be transmitted to the weight measurement unit 131 via a communication line, whether wired or wirelessly.

In embodiments of the invention, the sensor assembly 113 is a non-contact sensor assembly 113. In one embodiment, the sensor assembly 113 includes an eddy current sensor. For example, the sensor 114 may be a ferromagnetic material and coils configured to generate alternating magnetic fields to induce eddy currents in the sensor plate 115, which may be a metal sensor plate 115. The eddy currents may be detected by a coil of the sensor 114 to calculate a distance from the sensor plate 115 to the sensor 114, which may in turn be used to calculate the compression of the dampers 112.

In an alternative embodiment, the sensor assembly 113 may be a magnetoresistive sensor assembly 113. The sensor 114 may include a magnetoresistive element and the sensor plate 115 may include a magnetic element. The magnetic element of the sensor plate 115 may change a resistance of the sensor 114, changing a current flowing through the sensor 114. The resistance of the sensor 114 may be measured to calculate the distance from the sensor plate 115 to the sensor 114, which is in turn used to calculate the compression of the dampers 112.

In yet another embodiment, the sensor assembly 113 is an optical sensor assembly 113. In such an embodiment, the sensor 114 includes an optical transmitter and receiver, and the sensor plate 115 includes a reflective element. The distance travelled by light transmitted by the optical transmitter is measured by the optical receiver to calculate a height of the sensor plate 115. The calculated height of the sensor plate 115 is then used to calculate the compression of the dampers 112.

While a few examples of sensors assemblies 113 have been provided for purposes of description, embodiments of the invention encompass any sensor assembly capable of calculating a height of a bottom surface of the compartment 110 relative to the platform 121, or capable of calculating a height of the dampers 112 or a compression of the dampers 112. In addition, while FIG. 1 illustrates a sensor 114 on the platform 121 and sensor plate 115 on the compartment 110, embodiments of the invention also encompass sensors 114 on the compartment 110 and sensor plates 115 on the platform 121.

The control unit 130 may control operation of the compartment 110 based on the calculated weight of the compartment 110. For example, in one embodiment, the control unit 130 decreases a speed of ascent or descent of the compartment 110 based on detecting a large load or heavy weight. In another embodiment, the control unit 130 prevents movement of the compartment 110 along a shaft, such as an elevator shaft, based on detecting a heavy weight, such as a weight that exceeds a predetermined threshold.

Figure 2:
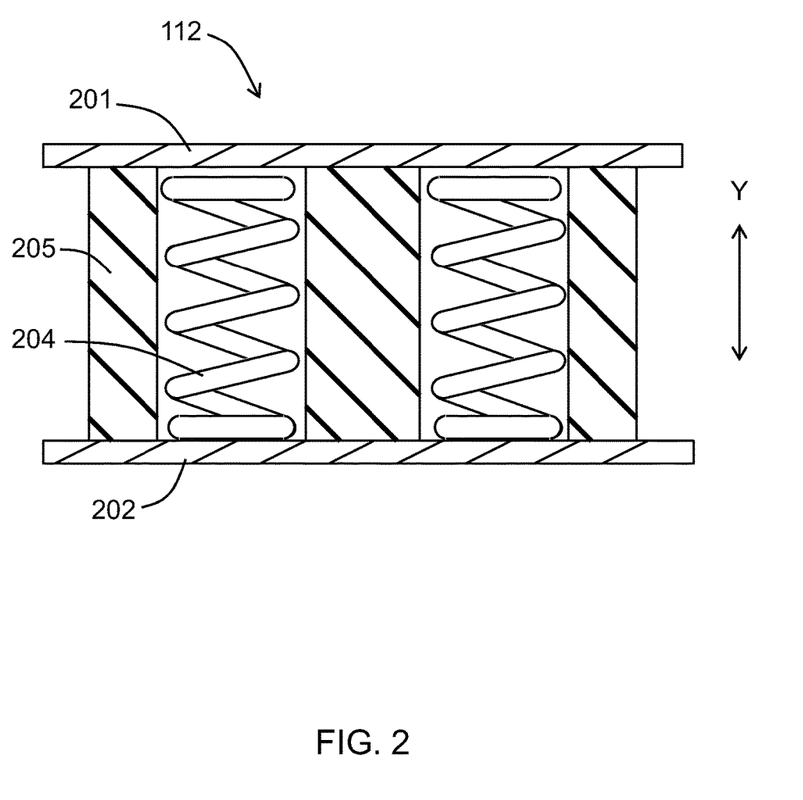
FIG. 2 illustrates a damper according to one embodiment of the invention.

FIG. 2 illustrates a damper 112 according to an embodiment of the invention. The damper 112 includes an upper plate 201 and a lower plate 202. The upper plate 201 and lower plate 202 may be made of metal or any other strong and stiff material. An elastic material 205 surrounds the springs 204 and extends between the upper plate 201 and the lower plate 202. In one embodiment, the elastic material 205 is rubber.

The upper plate 201 and lower plate 202 are configured to receive forces to compress the damper 112. For example, in one embodiment the upper plate 201 is attached to a compartment and the lower plate 202 is pressed against a platform or floor. In another embodiment, the lower plate 202 is fixed to a platform or floor and the upper plate 201 is pressed against a compartment that moves relative to the platform or floor. In one embodiment, the damper 112 is located between an elevator car and a platform on which the elevator car rests.

The springs 204 may be made of metal or any other stiff and resilient material. While coil springs are illustrated in FIG. 2, embodiments of the invention encompass any type of spring, including bent sheets or plates having one end fixed to a surface and an opposite end or other contact portion that is configured to contact a moving surface and exert a resisting force against the moving surface.

In embodiments of the invention, the spring 204 and elastic material 205 are configured to compress in a height or vertical direction Y at a predetermined rate corresponding to a load exerted against the upper plate 201 and lower plate 202. For example, when the lower plate 202 is fixed to a platform and a compartment presses against the upper plate 201, the spring 204 and elastic material 205 compress at a predetermined rate corresponding to a weight of the compartment. In one embodiment, the spring 204 and elastic material 205 are together designed or configured to compress at a linear rate relative to a weight of the compartment. In other words, x=ky, where x equals a load applied to the damper 112 corresponding to a weight of the compartment, y is a deformation length or height of the damper 112 and k is a constant based on the design of the damper 112. The spring 204 and elastic material 205 are composed and arranged to provide the value k, such as by increasing a stiffness of the spring or a density of the elastic material to increase the value k.

In embodiments of the invention, an elastic material may have a density that changes from a top of the damper 112 towards a bottom of the damper 112. In other words, since a force exerted by a coil spring against a resisting force tends to increase as the compression distance of the coil spring increases, the elastic material 205 may be configured to have a decreasing resistance force as the compression of the damper 112 increases, such as by changing a density of the elastic material 205 from a top of the damper 112 towards the bottom of the damper 112. If the spring 204 is configured to have an exponentially increasing resisting force, the elastic material 205 may be configured to have an exponentially decreasing resisting force. In addition, characteristics of the spring 204 may be adjusted to adjust a resisting force, such as by changing a distance between adjacent coils of a coil spring, changing an angle of a plate spring, or making any other desired changes to result in a combined physical resistance of the spring 204 and the elastic material 205 that is linear.

In addition, in embodiments of the invention, the elastic material 205 provides isolation transmissibility, which decreases noise of sensor measurements and decreases vibration of the damper 112. In addition, noise and vibration in the compartment 110 are decreased compared to systems using dampers without the elastic material 205 and springs 204.

Figure 3A:
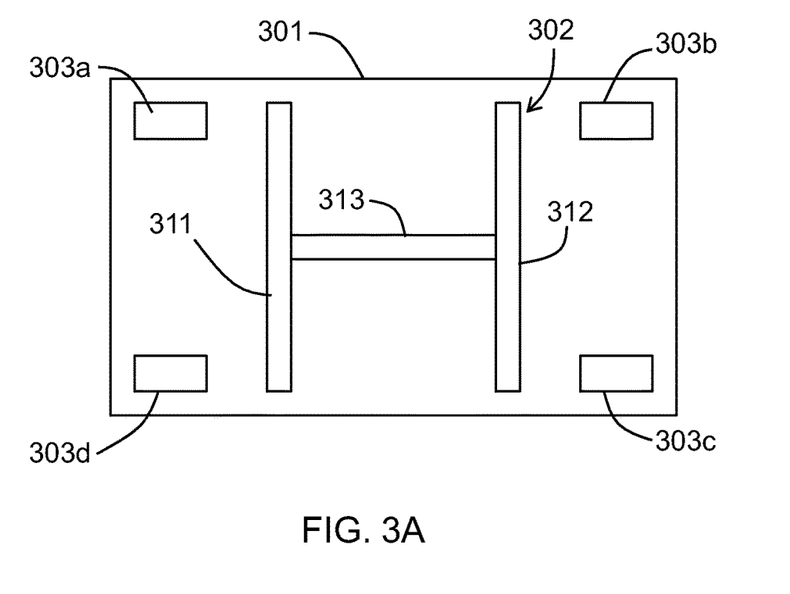
FIGS. 3A to 3C illustrate a sensor plate according to embodiments of the invention.
Figure 3B:
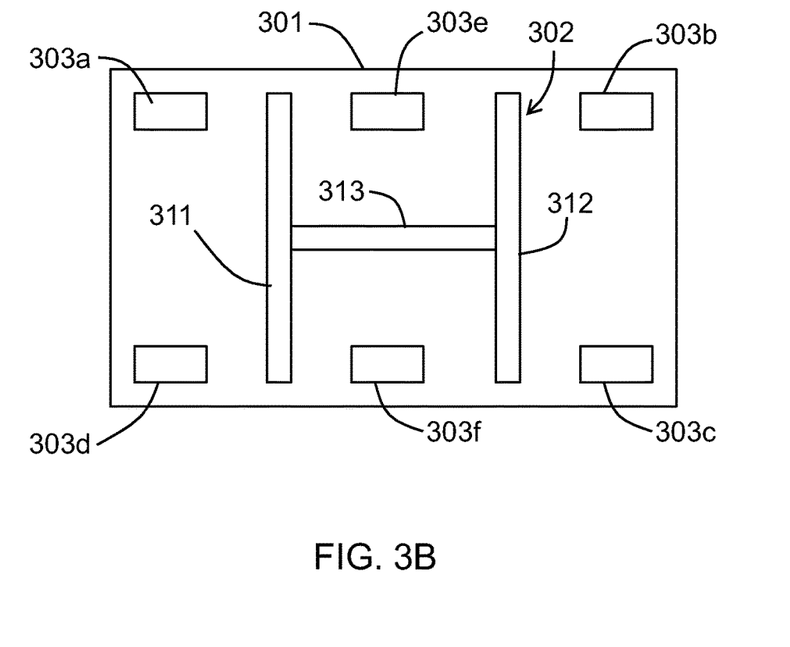
Figure 3C:
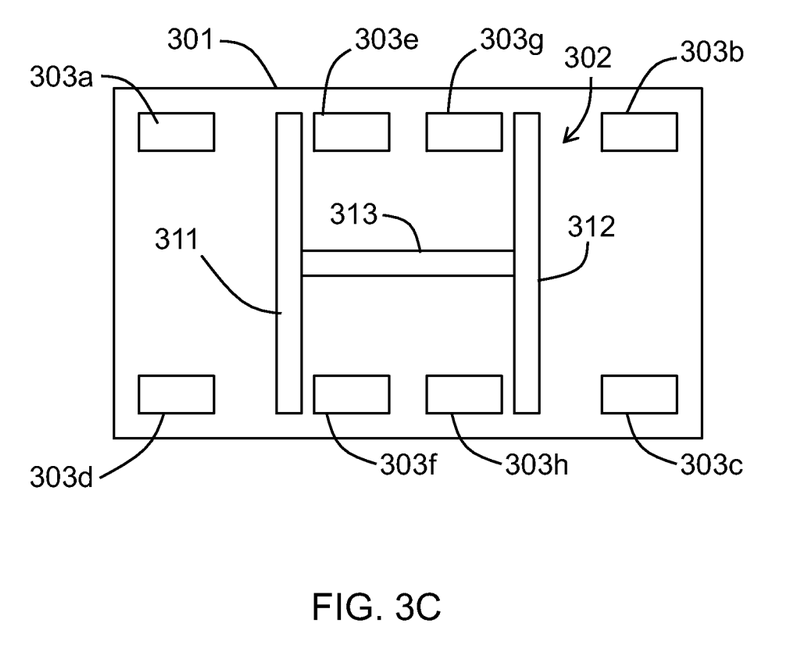

FIGS. 3A to 3C illustrate configurations of a sensor plate 302 and dampers 303 according to embodiments of the invention. The sensor plate 302 may correspond to the sensor plate 115 of FIG. 1. The sensor plate 302 is mounted on the bottom surface 301 of a compartment, such as the compartment 110 of FIG. 1. The sensor plate 302 has an H shape, including extended segments 311 and 312 that extend substantially to the edges of the bottom surface 301 and a center segment 313 that extends between the extended segments 311 and 312 at a substantially center position of each of the extended segments 311 and 312. Referring to FIG. 3A, dampers 303a, 303b, 303c and 303d are located outside the H-shaped sensor plate 302, at corners of the bottom surface 301. Dampers 303a and 303b are located at one end of the sensor plate 302 and dampers 303c and 303d are located at an opposing end of the sensor plate 302.

Referring to FIG. 3B, dampers 303e and 303f are located between the extended segments 311 and 312 at opposing ends of the sensor plate 302. Referring to FIG. 3C, dampers 303e and 303g are located between the extended segments 311 and 312 at one end of the sensor plate 302 and dampers 303f and 303h are located between the extended segments 311 and 312 at the opposite end of the sensor plate 302. In each configurations of FIGS. 3A, 3B and 3C, the dampers 303 must be configured such that weight applied to all of the dampers 303, such as weight applied by the bottom surface 301 of the compartment, results in a translation movement of the dampers 303 according to a predetermined algorithm, such as a linear algorithm, so that the weight of the compartment may be measured by measuring the translation movement of the dampers 303.

In one embodiment, the sensor plate 302 is centered with respect to the bottom surface 301 of the compartment. In other words, the width of the sensor plate 302 is centered with respect to the width of the bottom surface 301 and the length of the senor plate 302 is centered with respect to the length of the bottom surface 301. Referring to FIG. 1, the sensor 114 may be located at a width and length center location of the compartment 110 and the sensor plate 115 may also be located at the width and length center location of the compartment 110.

In embodiments of the invention, the H-shaped sensor plate 302 including dampers 303a to 303d located outside the sensor plate 302 and dampers 303e to 303h located between extended segments 311 and 312 of the sensor plate 302 reduce or eliminate variations in sensor readings due to a deformation of the bottom surface 301, or inaccurate sensor measurements, based on a non-balanced load of a compartment including the bottom surface 301. In other words, whereas in a conventional system a non-balanced load may result in inaccurate weight measurements, the H-shaped sensor plate 302 together with dampers 112 inside and outside the sensor plate 302 reduces or eliminates inaccurate weight measurements of the compartment including the bottom surface 301, even when the bottom surface 301 of the compartment 110 deforms under a load.

Figure 4:
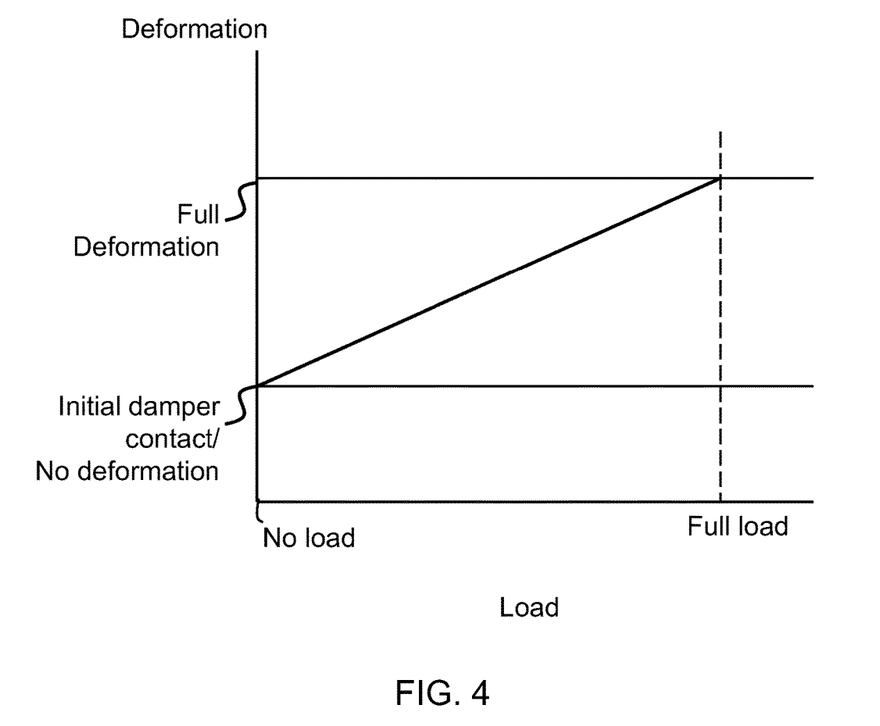
FIG. 4 is a graph illustrating measurement of a load according to one embodiment of the invention.

FIG. 4 is a graph illustrating load measurements according to an embodiment of the invention. As illustrated in FIG. 4, a domain axis corresponds to a load, and a range axis corresponds to a deformation of dampers. The point labeled "damper contact" corresponds to a point at which a load contacts a damper without exerting any force on the damper. As the deformation of the damper increases, the calculated load increases until a full load is detected, corresponding to a maximum deformation of the damper. As illustrated in FIG. 4, in one embodiment of the invention, a linear relationship exists between the deformation of the damper and the load of the compartment causing the deformation of the damper.

In one embodiment, a weight calculation unit detects the deformation of the damper and multiplies the measured deformation by a constant value to calculate the weight of the compartment, based on the force applied to the damper. However, embodiments of the invention encompass any predetermined relationship between a deformation of a damper and a weight or load applied to the damper, including linear relationships, logarithmic relationships, exponential relationships, reverse exponential relationships, or any other pre-set, designed, or predetermined relationship.

Figure 5:
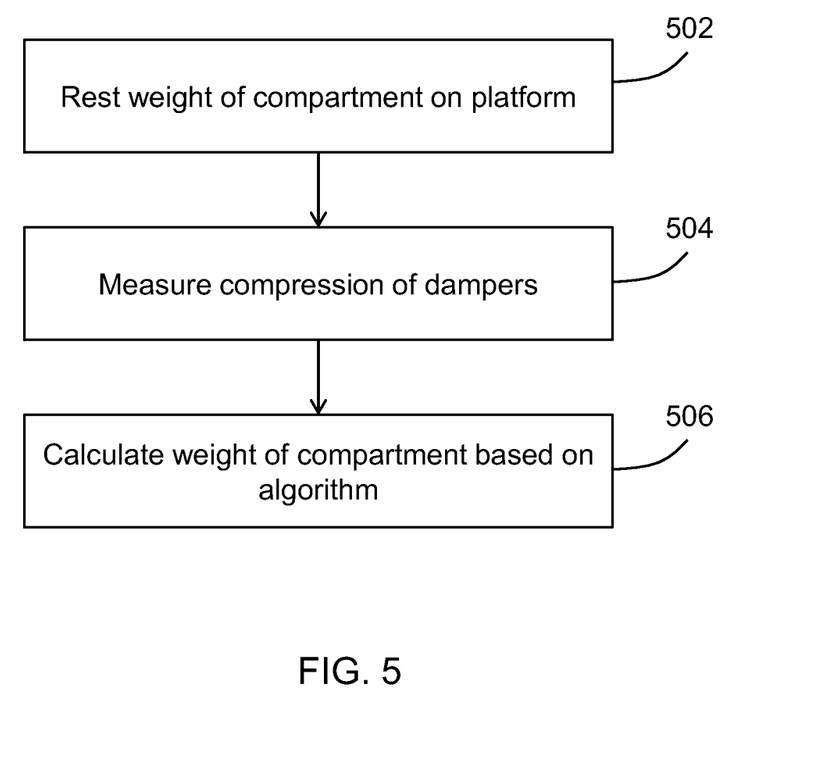
FIG. 5 is a flow diagram of a method according to an embodiment of the invention.

FIG. 5 illustrates a method according to an embodiment of the invention. In block 502 the weight of a compartment is rested on a platform. In one embodiment, the compartment is an elevator car that rests on a platform of an elevator carriage. In another embodiment, the elevator car is moved to a bottom of an elevator shaft to rest on a platform at the bottom of the elevator shaft. One or more dampers are positioned between the compartment and the platform and are configured to compress based on a weight of the compartment. The dampers are configured to press at a predetermined rate or according to a predetermined algorithm. For example, the dampers are made up of one or more spring mechanisms and elastic material that has properties, including composition, thickness, etc. that result in the compression characteristics of the dampers.

In block 504, a compression of the dampers is measured by a sensor. For example, one of the compartment and the platform may include an eddy current sensor, a magnetoresistive sensor, an optical sensor or any other sensor. In one embodiment, the sensor is a non-contact sensor that measures a distance between the sensor and the compartment to calculate the compression of the dampers. In particular, a weight calculation unit, which may include a processor and arithmetic logic unit, may retrieve from memory a value corresponding to a non-compressed damper and may calculate a difference between the value of the non-compressed damper and the measured value of the compressed damper. The resulting difference may correspond to the compression distance or height of the damper.

In block 506, the weight of the compartment is calculated based on a predetermined algorithm. The weight calculation unit may apply the calculated difference to the predetermined algorithm to calculate the weight. In one embodiment, the algorithm is a linear algorithm, such that the calculated difference corresponding to the compression of the damper is multiplied by a constant value to calculate the weight of the compartment. However, embodiments of the invention encompass any predetermined algorithm, including logarithmic, exponential, reverse exponential, and other algorithms.

In some embodiments, a control unit controls the operation of the compartment based on the calculated weight, such as by controlling an operating speed of the compartment or preventing movement of the compartment based on a weight that exceeds a predetermined threshold.

According to embodiments of the invention, a weight of a compartment, such as an elevator car, is measured by measuring the compression of dampers that compress at a predetermined rate relative to a weight applied to the dampers. The dampers are configured together with a sensor assembly to generate a weight calculation with a high accuracy without requiring contact between a sensor of the sensor assembly and the compartment. In addition, a sensor plate of the sensor assembly is configured to reduce or eliminate the effects of an imbalanced load of the compartment on a weight calculation. In embodiments of the invention, the weight of the compartment is measured at a relatively low cost, requiring little-to-no adjustment or calibration of the sensor assembly and decreasing wear of the sensor by utilizing a non-contact sensor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A load measurement system, comprising:
   a compartment;
   a damper configured to be positioned between the compartment and a platform and to compress at a predetermined rate based on a load of the compartment; and
   a weight calculation unit configured to calculate a weight of the compartment based on the compression of the damper;
   a non-contact sensor configured to measure a distance between the sensor and the compartment, wherein the weight calculation unit calculates the weight of the compartment based on the measured distance between the sensor and the compartment;
   wherein the sensor includes an H-shaped plate on a bottom surface of the compartment having ends of the H extending substantially to edges of the bottom surface.

2. The load measurement system of claim 1, wherein the sensor is an eddy-current transducer.

3. The load measurement system of claim 1, wherein the sensor is a magnetoresistive sensor.

4. The load measurement system of claim 1, wherein the sensor is an optical sensor.

5. The load measurement system of claim 1, wherein the weight calculation unit calculates a difference between a height of the damper when no weight is applied to the damper and a height of the damper based upon the damper being compressed between the compartment and the platform, and the weight calculation unit calculates the weight of the compartment by inserting the calculated difference into a predetermined algorithm.

6. The load measurement system of claim 5, wherein the predetermined algorithm is a linear algorithm comprising the multiplication of the difference with a constant value.

7. The load measurement system of claim 1, wherein the damper includes a first plurality of dampers located outside the H and first and second center dampers located at opposite ends of the H between extended segments of the H.

8. The load measurement system of claim 1, wherein the compartment is an elevator car.

9. The load measurement system of claim 1 wherein the damper comprises:
   a first spring located between the compartment and the platform; and
   an elastic filler surrounding the first spring,
   wherein the first spring and the elastic filler are configured to compress at a predetermined rate based on a force being exerted against the damper;
   wherein the predetermined rate is a linear rate.

10. The load measurement system of claim 9, wherein the elastic filler is rubber.

11. The load measurement system of claim 9, wherein the first spring is made of metal.

12. The load measurement system of claim 9, further comprising a second spring adjacent to the first spring arranged to compress together with the first spring.

* * * * *